United States Patent [19]

Pyles et al.

[11] Patent Number: 4,686,046
[45] Date of Patent: Aug. 11, 1987

[54] PROCESS FOR SEPARATING CYCLIC OLIGOMERIC DIHYDRIC PHENOL CARBONATE FROM AROMATIC POLYCARBONATE

[75] Inventors: Robert A. Pyles, Evansville; Patrick J. Mulvey, Mt. Vernon, both of Ind.

[73] Assignee: General Electric Company, Mt. Vernon, Ind.

[21] Appl. No.: 812,448

[22] Filed: Dec. 23, 1985

[51] Int. Cl.$^4$ .............................................. B01D 13/00
[52] U.S. Cl. ................................................... 210/651
[58] Field of Search ................................. 210/650–655

[56] References Cited

U.S. PATENT DOCUMENTS 3,148,141  9/1986  Schonenberger .................. 210/651

*Primary Examiner*—Ivars Cintins
*Attorney, Agent, or Firm*—Martin B. Barancik

[57] ABSTRACT

A process for separating cyclic oligomeric dihydric phenol carbonate from aromatic polycarbonate which comprises contacting a solution comprising a major amount of aromatic polycarbonate and a minor amount of cyclic oligomer with a semi-permeable membrane, and recovering a second solution which has passed through the said membrane, said second solution enriched in cyclic oligomer.

1 Claim, No Drawings

PROCESS FOR SEPARATING CYCLIC OLIGOMERIC DIHYDRIC PHENOL CARBONATE FROM AROMATIC POLYCARBONATE

BACKGROUND OF THE INVENTION

Polycarbonate is a well known thermoplastic polymer useful in a variety of settings including electrical components, parts wherein high thermal resistance is important and parts wherein high impact resistance is also significant. This polymer is made by a variety of well known methods including, for example, a lime process, pyridine process, solution process, melt polymerization, and interfacial polymerization. As typical of most reactions the reaction which produces high molecular weight aromatic polycarbonate is not totally selective. There are numerous side reactions also occurring at the same time. Therefore the yield of aromatic polycarbonate is not totally 100%. The side reactions and side products will differ according to the specific process employed including reactants and process conditions. It has recently been discovered in the laboratory of the assignee of this patent application, unknown to that date, that accompanying the production of high molecular weight, linear aromatic polycarbonate is a significant production of cyclic oligomeric dihydric phenol carbonates. Usually the linear oligomers are a reasonable side product in a reaction producing high polymer since it is the oligomer which has not fully reacted and entered the chain. In this case the oligomers not only do not react to enter the chain but also, surprisingly, react intramolecularly and form a cyclic system. Within the labs of the assignee utilizing the interfacial method of preparation, up to about 1.0 weight percent or more of the final product is cyclic oligomeric dihydric phenol carbonate. The cyclic oligomeric dihydric phenol carbonate hereinafter referred to as "cyclic oligomer" is separated from the linear high molecular weight aromatic polycarbonate while in the halogenated solvent methylene chloride. It has been found in the laboratory of the assignee that the addition of a lower ketone, for example acetone, brings about a differential solubility between the cyclic oligomer and the aromatic polycarbonate. The aromatic carbonate is insoluble in a composition containing a sufficient amount of acetone while the cyclic oligomers remain soluble in the solution. Therefore a simple phase separation occurs wherein a substantial proportion of the cyclic oligomers is efficiently separated from the aromatic polycarbonate.

The cyclic oligomers are recovered upon evaporation of the methylene chloride in acetone solution using steam precipitation. However, in order to make the process reasonably economical, both the acetone and methylene chloride must be recovered. In doing so there are certain disadvantages. Two distillation steps are necessary for solvent recovery—the separation of methylene chloride from acetone and also from water. The water is present from the steam precipitation recovery of the polycarbonate. In recovering the acetone from the cyclic oligomer the boiling of the acetone requires energy which is costly. Additionally it is rather difficult to recover methylene chloride, boiling point 40° C., from acetone, boiling point 58° C., and water both quantitatively and in pure form in a relatively inexpensive manner. Finally, a safety issue is present because of the flammability of acetone. Consequently, the prior process utilized to separate cyclic oligomers from aromatic polycarbonate has certain disadvantages.

A new process for separating cyclic oligomers from aromatic polycarbonate has been discovered. It does not utilize further organic solvents. Thus the problems associated with solvent recovery and safety procedures are no longer encountered.

SUMMARY OF THE INVENTION

In accordance with the invention there is a process for separating cyclic oligomeric dihydric phenol carbonate from aromatic polycarbonate which comprises contacting a solution comprising a major amount of aromatic polycarbonate and a minor amount of cyclic oligomer with a semi-permeable membrane, and recovering a solution which has passed through the said membrane, said solution enriched in cyclic oligomer.

DETAILED DESCRIPTION OF THE INVENTION

Any process can be employed to make the high molecular weight linear aromatic polycarbonate as long as the cyclic oligomer dihydric phenol carbonate (cyclic oligomer) side product is also present. A typical reaction procedure which produces cyclic oilgomer side product together with the high molecular weight aromatic polycarbonate is interfacial polymerization, that polymerization wherein the actual reaction between the dihydric phenol and the carbonate precursor occurs at the interface of two phases with the dihydric phenol being preferentially soluble in the first phase and the carbonate precursor preferentially soluble in the second phase. An example of such a polymerization is that carried out to make high molecular weight bisphenol-A polycarbonate wherein an aqueous solution of an alkali metal salt of bisphenol-A at alkaline pH is reacted with phosgene soluble in an organic solvent such as methylene chloride or similar halogenated hydrocarbon such as cis-1,2dichloroethylene and the like.

Surprisingly, a significant amount of reactants form side products rather than enter the high polymer. Even more surprisingly, a high proportion of these side products are cyclic oilgomers. Aromatic polycarbonate made by the well known interfacial method can produce a solid having at least about 98.5 weight % bisphenol-A polycarbonate with an intrinsic viscosity of 0.3 to 1.0 dl/g at 25° C. in methylene chloride. The remaining 1.5 weight percent or less is side products of which up to about 70 weight percent is cyclic oligomer.

Any semi-permeable membrane which remains essentially inert to the chemicals in contact with it and has a flux rate, number of holes/cm$^2$, sufficiently high to bring about differentiation between the linear large molecule and the cyclical smaller molecule can be employed. By "essentially inert" is meant the semi-permeable membrane does not detrimentally react with any of the chemicals in contact with it. The phenomenon of "membrane swelling" can occur to some extent but not to the point where it is substantially detrimental to the separation process.

The solution of aromatic polycarbonate and cyclic oligomer should be under a positive pressure to go through the mebrane. This pressure can be created by gravity, i.e. the mebrane at the bottom of an open container or that generated by a piston, or even a centrifuge. A common method is through simple osmotic pressure.

The semi-permeable membrane itself may be made of any material which meets the needs of the process. The preferred membrane is made of gellular cellulose, and is available from American Enka. Below is a Data Sheet from American Enka relating to the CUPROPHAN ® flat membrane.

| DATA SHEET CUPROPHAN ® FLAT MEMBRANE | | | | |
|---|---|---|---|---|
| Type | | | 100 M | |
| Thickness | dry | M | 10.5 | um |
| | | A | ±0.5 | |
| | wet | ~ | 22 | |
| Breaking load | dry | long. > | 2900 | cN/15mm |
| | | transv. > | 750 | |
| | wet | long. > | 1000 | |
| | | transv. > | 150 | |
| Elongation at break | dry | long. > | 11 | % |
| | | transv. > | 55 | |
| | wet | long. > | 14 | |
| | | transv. > | 100 | |
| Change of length after wetting | | long. ~ | −4 | % |
| | | transv. ~ | +8 | |
| Ultrafiltration 37° C. | | M | 4.0 | ml / n.m².mmHg |
| | | A | ±0.5 | |
| Permeability | urea | | 65 | $10^{-3}$ cm/min |
| | vit. B12 | | 7.6 | |
| Water content | | ~ | 6.3 | % |
| Glycerole | content | ~ | 12 | |
| | addition[a] | ~ | 15 | |

[a] in relation to dry cellulose
® = reg. trademark
M = mean value
A = deviation of the mean value The semi-permeable membrane ie preferably preconditioned with an appropriate solution or series of solutions usually ending with the contact of the solvent in which the cyclic oligomers are aromatic polycarbonate will contact the membrane. This precontact time is generally greater than four hours. The purpose of this preconditioning solvent treatment is to (1) remove the solvent in which the membrane is ordinarily packed and (2) to achieve the desired membrane premeability.

The aromatic polycarbonates and cyclic oligomers which can be effectively separated by this procedure include polycarbonate and cyclic oligomers prepared from standard dihydric phenols. Examples of such dihydrin phenols include:
2,2-bis(4-hydroxyphenyl)propane (bisphenol-A);
2,2-bis(3,5-dimethyl-4-hydroxyphenyl)propane;
2,2-bis(3,5-dibromo-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)pentane;
bis(4-hydroxyphenyl)methane;
bis(3,5-diethyl-4-hydroxyphenyl)methane;
1,3-bis(4-hydroxyphenyl)propane;
4,4'-thiodiphenol; and
4,4'-dihydroxy-2,6-dimethyldiphenyl ether.

The preferred dihydric phenols are of the formula

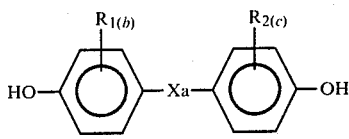

FIG. 1 wherein
a is 0 or 1,
X is alkylene of two to eight carbon atoms, inclusive, alkylidene of one to eight carbon atoms, exclusive,

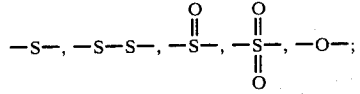

$R_1$ and $R_2$ are the same or different and are alkyl of one to four carbon atoms, inclusive, chloro or bromo, b and c are the same or different and are 0, 1 or 2.

Preferably a is 1, b and c are 0, and X is 2,2-isopropylidene.

Copolymers where there is more than one dihydric phenol can also be separated from cyclic oligomeric dihydric phenol carbonates. Generally the distribution of dihydric phenols in the cyclic oligomer is similar to the distribution in the high polymer. The high molecular weight aromatic polycarbonate generally has a minimum intrinsic viscosity (I.V.) dl/g. of about 0.3, preferably above 0.4 as measured in methylene chloride at 25° C. The maximum I.V. is not significant but for processing purposes an I.V. of less than about 1.0 is preferred. The cyclic oligomer dihydric phenol carbonate has an I.V. significantly below 0.3 and generally has no more than about 16 mer units. Examples of pure cyclic oligomer preparations include I.V.'s of 0.072, 0.090 and 0.100.

In FIG. 2 below is an example of cyclic oligomer utilizing bisphenol-A as the dihydric phenol.

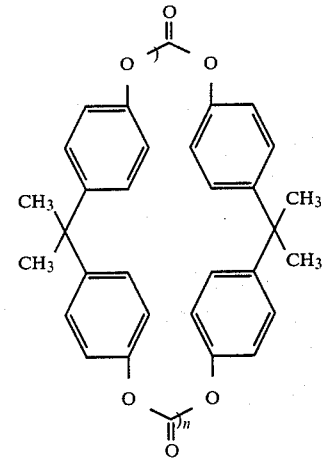

wherein n is an integer of 1 to about 15, preferably to about 11.

Below are examples of the invention.

The membrane was cut to fit into a glass cell (Lab-glass, Inc., Vineland, N.J.). The membrane was supported on a wire mesh screen and held between the two gasketed halves of the sealed cell. One half of the cell was charged with only reagent grade methylene chloride. An equivalent volume of reagent grade methylene chloride (containing cyclics and polymer mixture) was charged to the remaining empty half of the cell. The cell was then permitted to stand undisturbed for 16–24 hours. The cell half which was previously charged with reagent grade methylene chloride containing neither cyclics nor polymer was drained from the cell and the solvent was evaporated. A solid residue was recovered which was analyzed for cyclics and polymer content.

Enrichment of the solution passing through the membrane in the cyclic oligomer is demonstrated. Positive pressure is created by concentration gradient or osmotic pressure. The initial solution was 84 weight percent methylene chloride, 9.6 weight percent cyclic oligomer and 6.4 weight percent aromatic polycarbonate. The membrane was a Cuprophan type flat membrane 100M available from Enka A.G., Corona Del Mar, Calif. 92625. Below is the conditioning pretreatment, the material transported, the enrichment start and final figures and showing the effect of the membrane.

EXAMPLE 1

Membrane
    Cuprophan type 100M
Conditioning
    5 hours in 100% dichloromethane
Material transported
    3.72 weight % cyclics
    2.06% polymer
Enrichment
    start 60% cyclics; 40% polymer
    final 73.1% cyclics; 26.9% polymer

EXAMPLE 2

Membrane
    Cuprophan type 100
Conditioning
    2 hours in methyl alcohol
    2 hours in acetone
    2 hours in chloroform
    2 hours in dichloromethane
Material transported—nondetectable

EXAMPLE 3

Membrane
    Cuprophan type 100
Conditioning
    24 hours in 100% water
    24 hours in 75% water, 25% acetone
    24 hours in 50% water, 50% acetone
    24 hours in 25% water, 75% acetone
    24 hours in 100% acetone
    24 hours in dichloromethane
Material transported
    2.62% cyclics
    0.7% polymer
Enrichment
    starts 57% cyclics; 43% polymer
    final 83.4% cyclics; 16.6% polymer

What is claimed is:

1. A process for separating cyclic oligomeric dihydric phenol carbonate from aromatic polycarbonate polymer which comprises contacting a solution comprising a major amount of aromatic polycarbonate and a minor amount of cyclic oligomer dihydric phenol carbonate with a semi-permeable membrane, and recovering a second solution which has passed through the said membrane, said second solution enriched in cyclic oligomer dihydric phenol carbonate.

* * * * *